United States Patent
Woo et al.

(10) Patent No.: US 6,924,591 B1
(45) Date of Patent: Aug. 2, 2005

(54) IMPLOSION PREVENTING BAND AND CATHODE RAY TUBE HAVING THE SAME

(75) Inventors: Tok-Chin Woo, Kyungki-do (KR); Hyung-Seok Oh, Suwon (KR); Woo-Seok Yang, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 93 days.

(21) Appl. No.: 10/401,885

(22) Filed: Mar. 31, 2003

(30) Foreign Application Priority Data

May 15, 2002 (KR) .............................. 10-2002-0026792

(51) Int. Cl.⁷ .............................................. H04N 5/65
(52) U.S. Cl. .................. 313/477 R; 313/479; 313/478; 313/482; 313/313; 348/821; 348/822; 348/825; 220/2.1 A; 220/2.3 A
(58) Field of Search ............................ 313/447 R, 479, 313/482, 478; 348/821–825; 220/2.1 A, 2.3 A

(56) References Cited

U.S. PATENT DOCUMENTS

| | | | |
|---|---|---|---|
| 4,858,016 A | * | 8/1989 | Suehiro et al. ............. 348/822 |
| 5,057,929 A | | 10/1991 | Hermann ..................... 358/246 |
| 5,181,123 A | | 1/1993 | Swank ........................ 358/246 |
| 5,347,367 A | * | 9/1994 | Swank et al. ................ 348/822 |
| 5,416,595 A | * | 5/1995 | Wield .......................... 348/825 |
| 5,606,377 A | * | 2/1997 | Swank ........................ 348/821 |

* cited by examiner

*Primary Examiner*—Nimeshkumar D. Patel
*Assistant Examiner*—Sikha Roy
(74) *Attorney, Agent, or Firm*—Robert E. Bushnell, Esq.

(57) ABSTRACT

An implosion preventing band for a cathode ray tube includes a main band formed around an outer surface of a skirt of a face panel, and including a pair of long sides provided on opposite sides of the skirt in a direction corresponding to long sides of a screen, a pair of short sides provided on opposite sides of the skirt in a direction corresponding to short sides of a screen, and corners formed between the long sides and the short sides to interconnect the same; and degaussing coil supports formed raised from the main band on long and short sides of the main band, and each having formed one or more openings that allow passage in a direction of a width of the main band, a degaussing coil(s) being supported using the openings. A plurality of the openings is formed continuously in the degaussing coil supports in a circumferential direction of the main band.

22 Claims, 7 Drawing Sheets

IMPLOSION PREVENTING BAND AND CATHODE RAY TUBE HAVING THE SAME

CLAIM OF PRIORITY

This application makes reference to, incorporates the same herein, and claims all benefits accruing under 35 U.S.C § 119 from an application entitled "EXPLOSION PROOF BAND AND CATHODE RAY TUBE THEREWITH" earlier filed with the Korean Intellectual Property Office on May 15, 2002 and there duly assigned Serial No. 2002-26792.

BACKGROUND OF THE INVENTION

1. Field of the Invention

The present invention relates to a cathode ray tube. More particularly, the present invention relates to an implosion preventing band for a cathode ray tube, in which the implosion preventing band prevents the scattering of glass if a bulb of the cathode ray tube implodes and includes degaussing coil supports for the mounting of a degaussing coil(s).

2. Description of the Related Art

Metal parts are typically found in a cathode ray tube (CRT). Such metal parts include (a) a color selection apparatus including a shadow mask that has a plurality of apertures for performing color separation of three electron beams, which are emitted from an electron gun, to corresponding R (red), G (green), B (blue) phosphors of a phosphor screen, and a mask frame for fixedly supporting the shadow mask at a predetermined location in the CRT; and (b) an inner shield for shielding from the earth's magnetic field a path through which the electron beams traject.

However, the metal parts nevertheless are exposed to and are magnetized by the earth's magnetic field so that a magnetic field is formed in the peripheries of the metal parts. This magnetic field formed in the peripheries of the metal parts changes the paths through which the electron beams traject such that the intended phosphors are not illuminated by the electron beams. That is, mis-landing of the electron beams occurs, and this reduces picture quality.

To remedy this problem, a degaussing coil(s) is mounted on an outer surface of a funnel of the CRT. The degaussing coil operates for a period of three to four seconds each time the CRT is turned on, during which time a degaussing current is used to demagnetize the metal parts.

An implosion preventing band that applies a predetermined compressive force to a bulb of the CRT is mounted to an outer surface of the bulb, particularly to an outer surface of a skirt of a face panel of the bulb. The implosion preventing band prevents scattering of glass if a crack formed in the bulb causes the same to implode.

Research is being performed on technology in which the implosion preventing band is used for mounting degaussing coils. U.S. Pat. No. 5,057,929 by Hermann for Cathode Ray Tube Having Implosion Band with Raised Tabs and Method and U.S. Pat. No. 5,181,123 by Swank for Cathode-Ray Tube Having a Shrinkfit Implosion Protection Band with Tension Limiting Means disclose configurations in which a plurality of protrusion tabs or clip receivers are formed on an outer circumference of an implosion preventing band, and a degaussing coil(s) is mounted using the protrusion tabs or clip receivers.

However, the protrusion tabs or clip receivers are typically made by a punching or piercing process such that sharp burrs are formed along edges of the protrusion tabs or clip receivers. Accordingly, if a degaussing coil(s) is mounted using an implosion preventing band that includes such protrusion tabs or clip receivers, the burrs may injure a worker or damage the insulation of the degaussing coils. If burrs are formed in areas contacting the bulb, the burrs may scratch the surface of the bulb such that it more easily explodes when receiving a shock.

Further, with such a structure of the conventional implosion preventing band, it is not possible to vary the positioning of the degaussing coils without re-structuring the entire implosion prevention band. That is, once formed, the protrusion tabs or clip receivers allow for only a single mounting configuration of the degaussing coils and varying the same requires a corresponding change in where the protrusion tabs or clip receivers are formed on the implosion preventing band. Accordingly, no flexibility is provided with respect to varying the mounting position of the degaussing coils.

SUMMARY OF THE INVENTION

It is one object of the present invention to provide an implosion preventing band and a cathode ray tube having the same, in which the implosion preventing band does not pose safety risks to assembly workers or damage a bulb of the cathode ray tube as in the earlier art, and allows for variations in the mounting of a degaussing coil(s) using a single configuration.

It is another object to provide an implosion preventing band and a cathode ray tube having the same that makes it easy to change the mounting configuration of the degaussing coil(s).

It is yet another object to provide an implosion preventing band and a cathode ray tube having the same, in which the implosion preventing band is easy and inexpensive to manufacture and implement It is still another object to provide an implosion preventing band and a cathode ray tube having the same, in which the implosion preventing band includes degaussing coil supports that provide a stable structure while a tensional strength of the implosion preventing band is not affected.

In one embodiment, the present invention provides an implosion preventing band for a cathode ray tube including degaussing coil supports formed raised from a main band on long and short sides of the main band, and each having formed one or more openings that allow passage in a direction of a width of the main band, a degaussing coil(s) being supported using the openings, and a plurality of the openings being formed continuously in the degaussing coil supports in a circumferential direction of the main band.

Preferably, the degaussing coil supports are formed having a triangular form in cross section with each degaussing coil support including a front face having an outer surface opposing the face panel, and a rear face having an outer surface opposing the neck, and in which a point where the front face and the rear face meet has a maximum height from the outer surface of the skirt.

In another embodiment, the degaussing coil supports are realized by raising edges of the main band on long and short sides of the same, in which the edges that are raised are closest to a neck of the cathode ray tube such that the main band is bent at a predetermined angle and such that these edges have a maximum height from the outer surface of the skirt.

With the implosion preventing band structured as described above, the degaussing coil supports do not pose a safety risk to assembly workers nor do they damage the bulb. Also, with the provision of the plurality of openings in the degaussing coil supports in a continuous manner, it is easy to change the mounting configuration of the degaussing coil(s).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
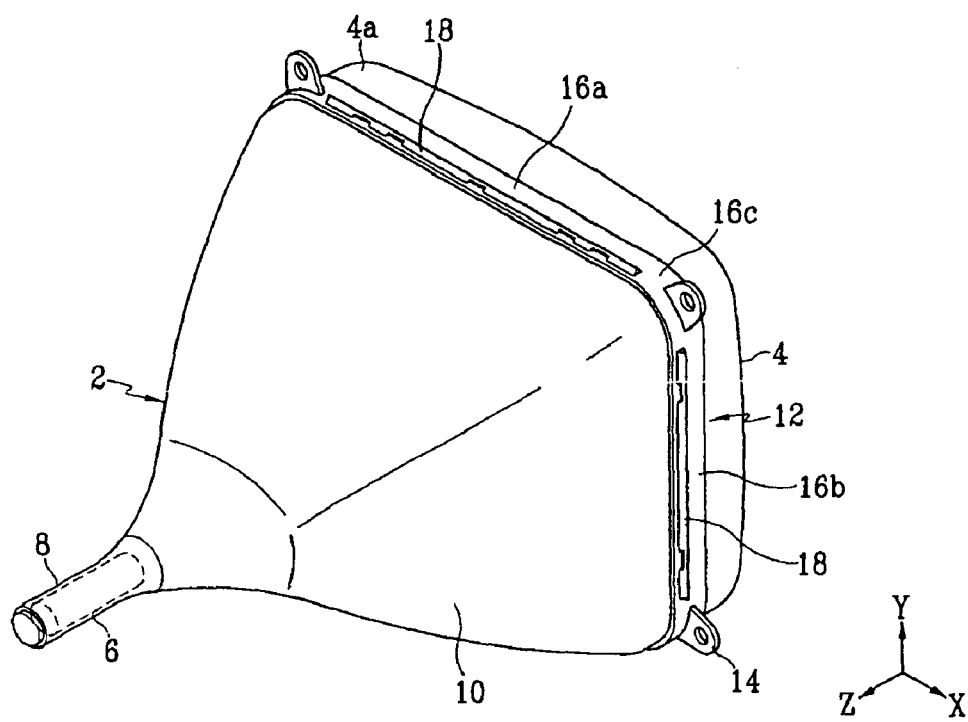
FIG. 1 is a perspective view of a bulb of a cathode ray tube to which an implosion preventing ban according to a first embodiment of the present invention is mounted.
Figure 2:
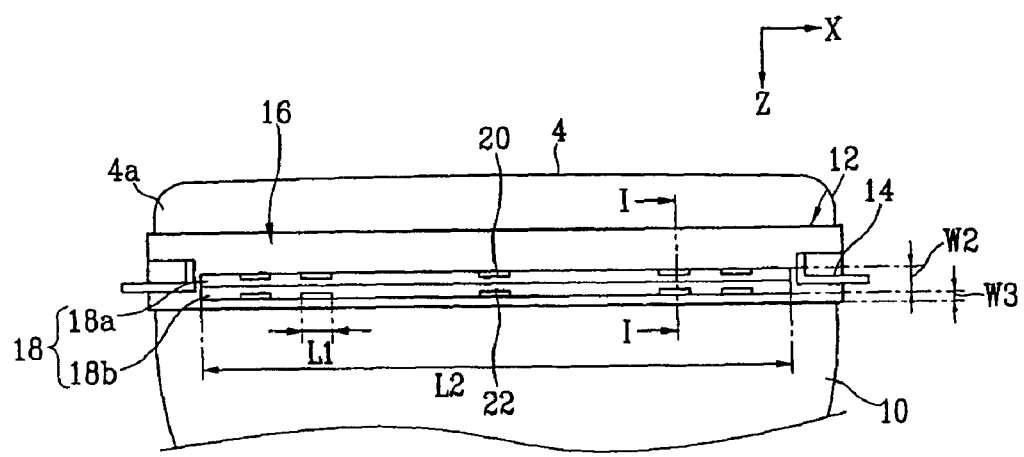
FIG. 2 is a partial plan view of the bulb of the cathode ray tube of FIG. 1.
Figure 3:
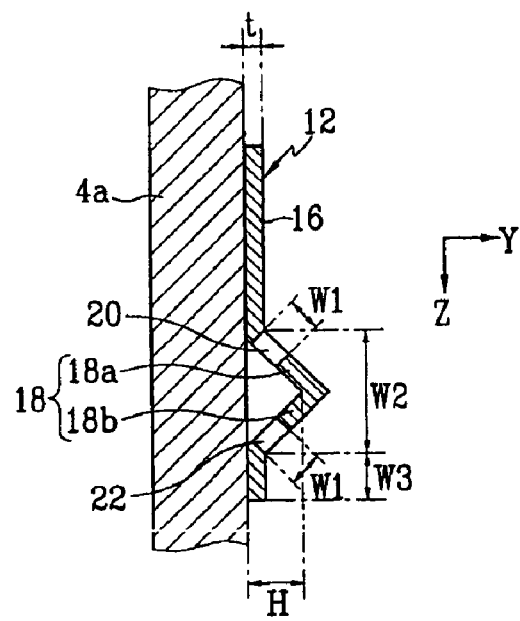
FIG. 3 is a sectional view taken along line I—I of FIG. 2.

FIG. 1 is a perspective view of a bulb of a cathode ray tube to which an implosion preventing band according to a first embodiment of the present invention is mounted, FIG. 2 is a partial plan view of the bulb of the cathode ray tube of FIG. 1, and FIG. 3 is a sectional view taken along line I—I of FIG. 2. Reference numeral 2 in the drawings indicates the bulb of the cathode ray tube (CRT).

With reference to the drawings, the bulb 2 includes a face panel 4 on an inner surface of which is formed a phosphor screen (not shown), a neck 8 including an electron gun 6 mounted therein, and a funnel 10 formed between and connected to the face panel 4 and the neck 8. These elements are fused into an integral unit to form the bulb 2, and the inside of the bulb 2 is evacuated to form a high vacuum state therein of approximately $10^{-7}$ torr.

An implosion preventing band 12 is mounted to an outer circumferential surface of a skirt 4a of the face panel 4. In a non-heated and free (non-attached) state, the implosion preventing band 12 has an inner circumference that is slightly smaller than the outer circumference of the skirt 4a. Accordingly, if the implosion preventing band 12 is heated and then placed on the skirt 4a, the implosion preventing band 12 will shrink when cooled to provide a predetermined compressive force to the bulb 2.

The implosion preventing band 12 of the first embodiment of the present invention includes degaussing coil support portions 18. The degaussing coil support portions 18 are configured such that assembly workers are not injured and so that a degaussing coil and the bulb 2 are not damaged. Also, the degaussing coil support portions 18 easily allow for the mounting of various different types of degaussing coils.

In more detail, the implosion preventing band 12 includes (a) a main band 16 including a pair of long sides 16a provided on the outer surface of the skirt 4a along an axis X direction on opposite sides of the skirt 4a, a pair of short sides 16b provided on the outer surface of the skirt 4a along an axis Y direction on opposite sides of the skirt 4a, and corners 6c formed between the long sides 16a and the short sides 16b to interconnect these portions of the main band 16; and (b) degaussing coil supports 18 provided along each of the long and short sides 16a and 16b of the main band 16 and including a plurality of holes 20 and 22 for the mounting of a degaussing coil(s).

The degaussing coil supports 18 are formed by bending portions of the long and short sides 16a and 16b of the main band 16 using a formation mold (not shown) such that the degaussing coil supports 18 have substantially a triangular cross section and are formed along a circumferential direction of the implosion preventing band 12. In more detail, each of the degaussing coil supports 18 includes a front face 18a, an outer surface of which opposes the face panel 4, and a rear face 18b, an outer surface of which opposes the neck 8. A point where the front face 18a and the rear face 18b meet has a maximum height H (see FIG. 3) from the outer surface of the skirt 4a.

Further, formed in each of the front and rear faces 18a and 18b of the degaussing coil supports 18 at locations opposing one another along the axis Z direction are first and second openings 20 and 22, respectively. That is, each first opening 20 opposes one of the second openings 22 along the axis Z direction. A plurality of pairs of the first and second openings 20 and 22 are formed in each of the degaussing coil supports 18. Fixing members (to be described hereinafter) pass through the openings 20 and 22 of the degaussing coil supports 18 to support a degaussing coil(s).

The first and second openings 20 and 22 formed respectively in the front and rear faces 18a and 18b of the degaussing coil supports 18 are formed in pairs as described above, that is, the number of first openings 20 corresponds to the number of second openings 22. Preferably, the first and second openings 20 and 22 are substantially rectangular having a length L1 in the direction of the lengths of either the long sides 16a or short sides 16b of the main band 16 where the openings 20 and 22 are formed, and a width W1 substantially perpendicular to the lengths L1.

In addition, the degaussing coil supports 18 are structured satisfying the following six conditions, which ensure that a stable structure is realized while a tensional strength of the implosion preventing band 12 is not affected.

Using one of the degaussing coil supports 18 provided on one of either the long sides 16a or the short sides 16b of the main band 16 as an example, if a length of the degaussing coil support 18 is L2, a sum of all the lengths L1 of the first and second openings 20 and 22 (i.e., the lengths L1 of each pair of the first and second openings 20 and 22) ΣL1 must satisfy the following condition, $$0.1\,L2 < \Sigma L1 < 0.5 L2.$$

This condition is provided for the following reasons. If the value of ΣL1 matches or exceeds 50% of L2, deformation of the implosion preventing band 12 may result when forming the openings 20 and 22, while if the value of ΣL1 matches or is less than 10% of L2, the lengths L1 of the openings 20 and 22 are not sufficiently large to perform their function of supporting the degaussing coil(s).

Further, a sum of the lengths L2 of all the degaussing coil supports 18 ΣL2 may be the same as a circumferential length L3 of the main band 16. However, since the degaussing coil supports 18 need not be provided on the corners 16*c* of the main band 16 on which the ears 14 are formed, it is sufficient that the sum of the lengths L2 of all the degaussing coil supports 18 ΣL2 is 50% or more the circumferential length L3 of the main band 16.

Accordingly, the sum of the lengths L2 of all the degaussing coil supports 18 ΣL2 satisfies the following condition, $$0.5L3 < \Sigma L2 \leq 1.0L3.$$

Further, if a thickness of the main band 16 is t, the maximum height H between a point where the front face 18*a* and the rear face 18*b* of the degaussing coil supports 18 meet (hereinafter referred to simply as the maximum height H) and the outer surface of the skirt 4*a* satisfies the following condition, $$H > 2.0t.$$

The maximum height H must be greater than two times the thickness t of the main band 16 to ensure for a sufficient space for the insertion of a fixing member such as a tie band, fixing bracket, etc., which supports the degaussing coil(s).

The short-side widths W1 of the first and second openings 20 and 22 satisfy the following condition with respect to the maximum height H and with respect to the thickness t of the main band 16, $$W1 < (H - 2t).$$

This condition allows for enough space to form the short-side widths W1 of the first and second openings 20 and 22.

In addition, if a width W2 of the degaussing coil supports 18 in the axis Z direction is less than the maximum height H, the degaussing coil supports 18 form a sharp edge along their outermost portions. This may pose a safety risk to assemblers and may result in damaging the surface of the a degaussing coil(s).

Accordingly, the width W2 of the degaussing coil supports 18 and the maximum height H of the degaussing coil supports 18 satisfy the following condition, $$W2 \geq H.$$

Finally, if a distance between an outer surface of an end of the rear face 18*b* of the degaussing coil supports 18 (i.e., the end of the rear face 18*b* closest to the skirt 4*a*) and an edge of the implosion preventing band 12 closest to this end of the rear face 18*b* of the degaussing coil supports 18 is W3, the following condition is satisfied with respect to the thickness t of the main band 16, $$W3 > 2t.$$

This condition must be satisfied so that following the formation of the degaussing coil supports 18, the rear face 18*b* of the degaussing coil supports 18 does not become separated from the outer surface of the skirt 4*a* to thereby form sharp burrs.

FIGS. 4 through 8 show examples of various structures for mounting a degaussing coil to the implosion preventing band 12 as described above. That is, examples are described with reference to these drawings, in which fixing members such as tie bands 24 or fixing brackets 26 are used in different ways to mount a degaussing coil 28 to the implosion preventing band 12.

Figure 4:
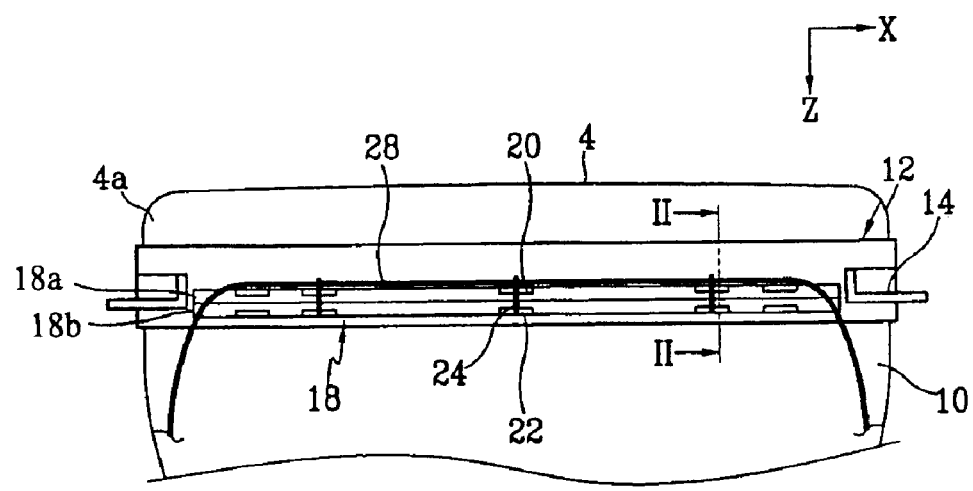
FIG. 4 is a partial plan view of a bulb of a cathode ray tube, in which a degaussing coil is mounted to an implosion preventing band of FIG. 2.
Figure 5:
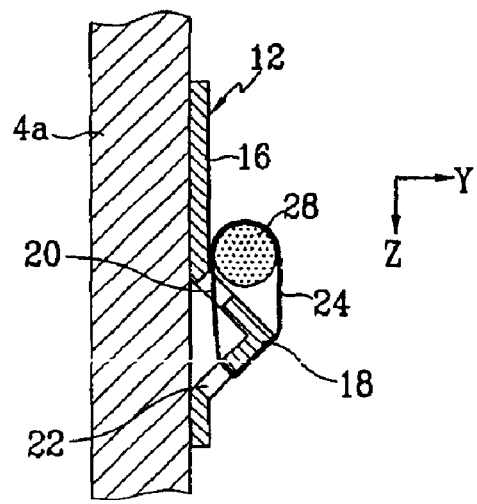
FIG. 5 is a sectional view taken along line II—II of FIG. 4.

Referring first to FIGS. 4 and 5, the degaussing coil 28 is positioned on the front face 18*a* of the degaussing coil support 18 shown in the drawings (or adjacent or in close proximity to the front face 18*a*). Next, a tie band 24 is passed through each pair of the first and second openings 20 and 22 and used to fasten the degaussing coil 28, thereby fixedly mounting the degaussing coil 28 to the implosion preventing band 12.

Figure 6:
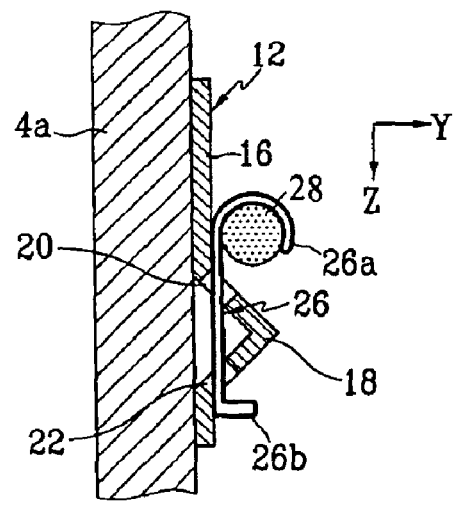
FIGS. 6 through 8 are sectional views taken along line II—II of FIG. 4 showing various different configurations of the mounting of the degaussing coil to the implosion preventing band.

Referring to FIG. 6, a fixing bracket 26 may be passed through each pair of the first and second openings 20 and 22 to secure the degaussing coil 28. Using a single fixing bracket 26 as an example, one end 26*a* of the fixing bracket 26 is curved into a semicircular shape to hook onto the degaussing coil 28, and its other end 26*b* is bent at approximately a right angle so that the fixing bracket 26 may not be removed from the implosion preventing band 12.

Figure 7:
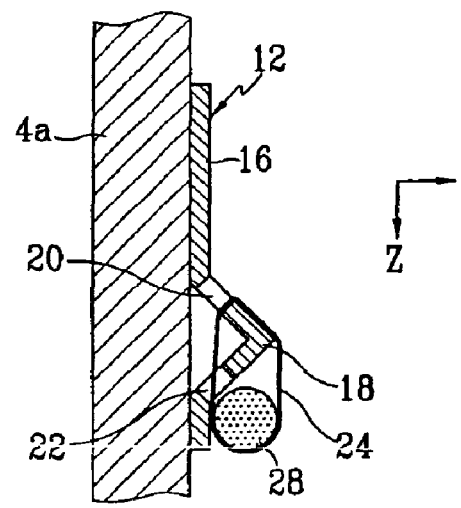
Figure 8:
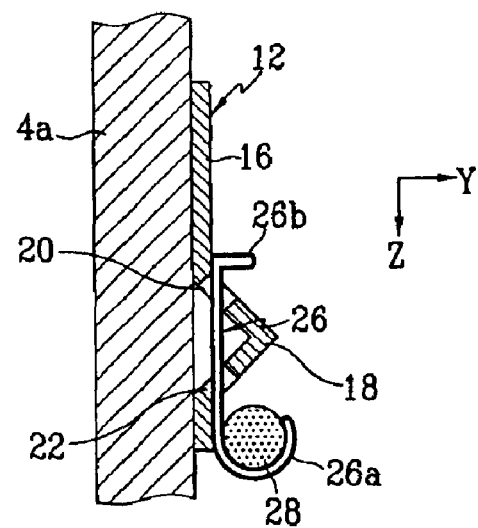

With reference to FIGS. 7 and 8, the degaussing coil 28 is positioned on the rear face 18*b* of the degaussing coil support 18 shown in the drawings (or adjacent or in close proximity to the rear face 18*b*). Next, a tie band 24 or a fixing bracket 26 structured as described above is passed through each pair of the first and second openings 20 and 22 and used to fasten the degaussing coil 28, thereby fixedly mounting the degaussing coil 28 to the implosion preventing band 12.

Since a plurality of pairs of the first and second openings 20 and 22 is provided in the degaussing coil supports 18 in a continuous manner around the circumference of the implosion preventing band 12 as described with reference to FIGS. 1, 2, and 3, it is possible to easily change the mounting positions of and spacing between the tie bands 24 or the fixing brackets 26. That is, it is unnecessary to change the configuration of the degaussing coil supports 18 or the tie bands 24 or the fixing brackets 26 themselves to obtain different mounting structures for the degaussing coil(s).

Figure 9:
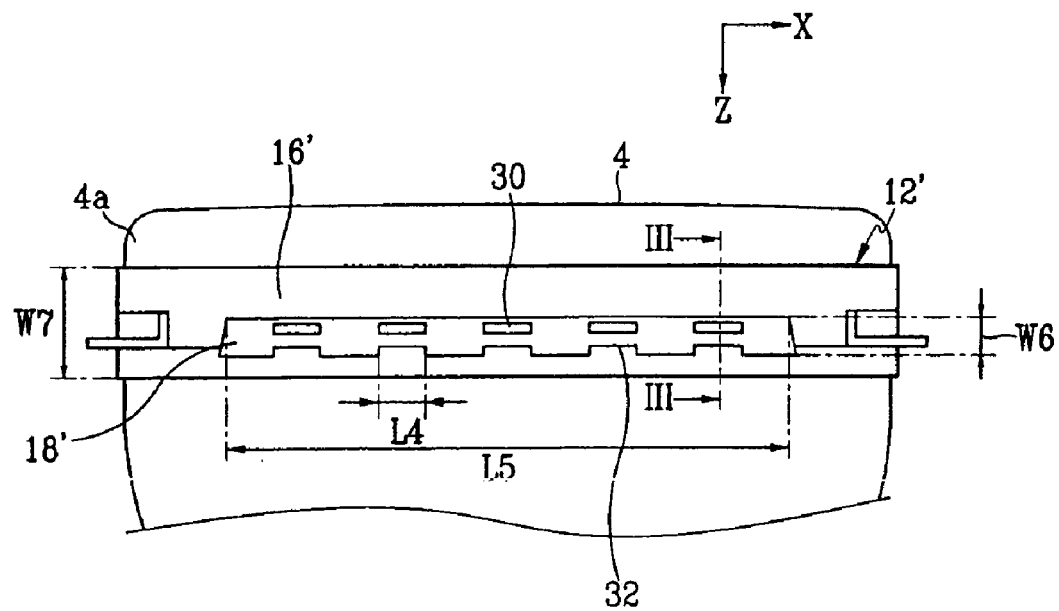
FIG. 9 is a partial plan view of a bulb of a cathode ray tube to which an implosion preventing band according to a second embodiment of the present invention is mounted.
Figure 10:
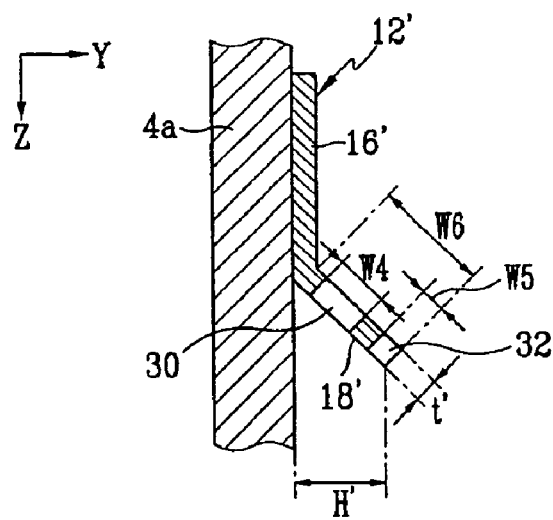
FIG. 10 is a sectional view taken along line III—III of FIG. 9.

FIG. 9 is a partial plan view of a bulb of a cathode ray tube to which an implosion preventing band according to a second preferred embodiment of the present invention is mounted, and FIG. 10 is a sectional view taken along line III—III of FIG. 9.

A degaussing coil support 18' according to a second preferred embodiment of the present invention is realized through a main band 16'. That is, one edge of the main band 16' farthest from a face panel 4 of the CRT (i.e., a predetermined section of this edge of the main band 16') is bent at a predetermined angle to form the degaussing coil support 18'. The degaussing coil support 18' has a maximum height H' extending from an outer surface of a skirt 4*a* of the face panel 4 to a furthermost distal end portion of the degaussing coil support 18'.

Further, formed in the degaussing coil support 18' are third and fourth openings 30 and 32, which are formed in pairs opposing one another in the axis Z direction. With the formation of the degaussing coil support 18' as described above, that is, having a free distal end, the fourth openings 32 are formed as grooves that are shaped substantially as rectangles with one long side open.

Preferably, the third and fourth openings 30 and 32 have a length L4 along a lengthwise direction of the implosion preventing band 12' (i.e., along a lengthwise direction of long sides or short sides of the main band 16', which ever the particular degaussing coil support 18' having the third and fourth openings 30 and 32 is formed). Also, it is preferable that the third and fourth openings 30 and 32 have widths W4 and W5, respectively, in a direction substantially perpendicular to the direction of the lengths L4.

A plurality of pairs of the third and fourth openings 30 and 32 structured as described above is formed along the lengthwise direction of the implosion preventing band 12' in the degaussing coil supports 18'. Accordingly, various different mounting configurations may be employed with respect to a degaussing coil(s).

The implosion preventing band 12' according to the second preferred embodiment of the present invention is structured to satisfy the following five conditions such that a stable structure is. realized while the tensional strength of the implosion preventing band 12' is not affected.

First, using one of the degaussing coil supports 18' provided on one of either the long sides or short sides of the main band 16' as an example, if a length of the degaussing coil support 18' is L5, a sum of the all the lengths L4 of the third and fourth openings 30 and 32 (i.e., the lengths L1 of each pair of the third and fourth openings 30 and 32) ΣL4 must satisfy the following condition, $$0.1L5 < \Sigma L4 \leq 0.5L5.$$

The condition must be satisfied or the following occur. If the value of ΣL4 matches or exceeds 50% of L5, deformation of the implosion preventing band 12' may result when forming the openings 30 and 32. Also, if the value of ΣL4 matches or is less than 10% of L5, the lengths L4 of the openings 30 and 32 are not sufficiently large to perform their function of supporting the degaussing coil(s).

Further, a sum of the lengths L5 of all the degaussing coil supports 18' τL5 maybe the same as a circumferential length L6 of the main band 16'. However, since the degaussing coil supports 18' need not be provided on corners of the main band 16', it is sufficient that the sum of the lengths L5 of all the degaussing coil supports 18 ΣL5 be 50% or more the circumferential length L6 of the main band 16'. Hence, the sum of the lengths L5 of all the degaussing coil supports 18 ΣL5 satisfies the following condition, $$0.5L6 < \Sigma L5 \leq 1.01L6.$$

In addition, if a thickness of the main band 16' is t', the maximum height H' that extends from the outer surface of the skirt 4a to the distal end portion of the degaussing coil support 18' (hereinafter referred to simply as the maximum height H') satisfies the following condition, $$2.0t' < H' < 10.0t'.$$

This condition must be satisfied for the following reasons. The maximum height H' must 11 be greater than two times the thickness t' of the main band 16' to ensure for a sufficient space for the insertion of a tie band, fixing bracket, etc. for the support of the degaussing coil(s). Also, if the maximum height H' matches or exceeds ten times the thickness t' of the main band 16', the height of the degaussing coil support 18' becomes excessive such that problems result when mounting the CRT in a cabinet or other such assembly.

In addition, the widths W4 of the third openings 30 and the widths W5 of the fourth openings 32 satisfy the following conditions, $$W4 \geq W5,$$

$$W4 \leq H'.$$

These conditions allow for sufficient space for the insertion of a tie band, fixing bracket, etc. (for the support of a degaussing coil) into the third opening 30, and prevent the tie bands (when using these elements as the fixing elements) from moving about within the fourth openings 32. These conditions also ensure a minimum strength of the degaussing coil support 18'.

Finally, a width W6 of the degaussing coil support 18' satisfies the following condition with respect to a width W7 of the implosion preventing band 12' so that a tensional strength of the implosion preventing band 12' is not affected by the formation of the degaussing coil support 18', $$0.1W7 \leq W6 \leq 0.3W7.$$

It is necessary to satisfy this condition for the following reasons. If the width W6 of the degaussing coil support 18' exceeds 30% of the width W7 of the implosion preventing band 12', the strength of the implosion preventing band 12' decreases. If this part of the above condition is not satisfied and the width W7 of the implosion preventing band 12' is then increased in an effort to compensate (i.e., in order to maintain the strength of the implosion preventing band 12'), costs increase with the extra material required. Further, if the width W6 of the degaussing coil support 18' is not greater than or equal to 10% the width W7 of the implosion preventing band 12', the performance of the degaussing coil support 18' deteriorates.

FIGS. 11 through 14 show examples of various structures for mounting a degaussing coil to the implosion preventing band 12' as described above. That is, examples are described with reference to these drawings, in which fixing members such as tie bands 24 or fixing brackets 26' are used to mount a degaussing coil 28 to the implosion preventing band 12'.

Figure 11:
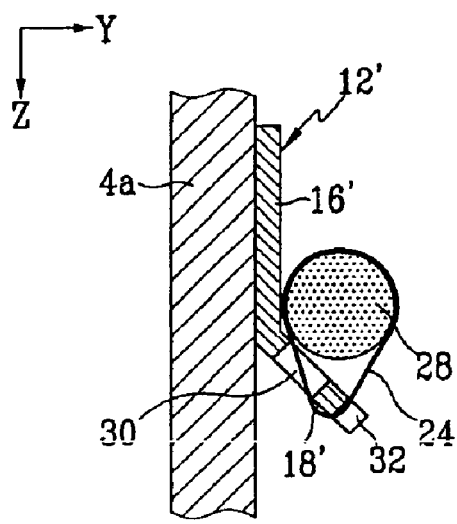
FIGS. 11 through 14 are sectional views showing various different configurations of the mounting of a degaussing coil to an implosion preventing band of FIG. 10.
Figure 12:
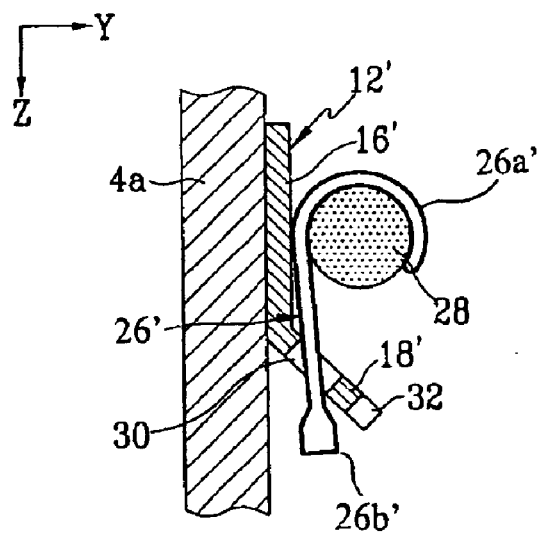

Referring first to FIGS. 11 and 12, the degaussing coil 28 is positioned on the degaussing coil support 18' (or on the main band 16' in close proximity to the degaussing coil support 18' or partly on the main band 16' and partly on the degaussing coil support 18'), and a tie band 24 or a fixing bracket 26' is passed through the third and fourth openings 30 and 32 and used to fasten the degaussing coil 28. This results in the degaussing coil 28 being fixedly mounted to the implosion preventing band 12'.

Figure 13:
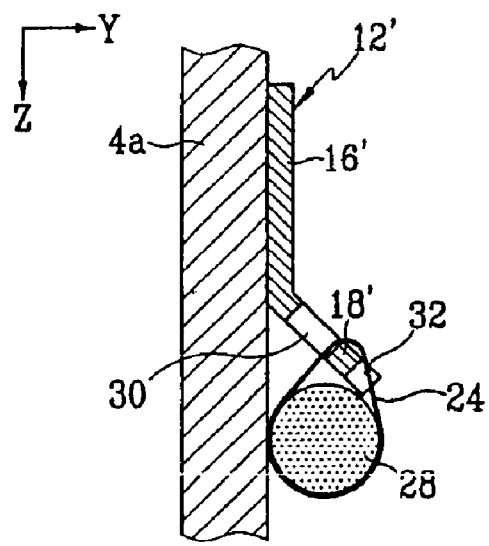
Figure 14:
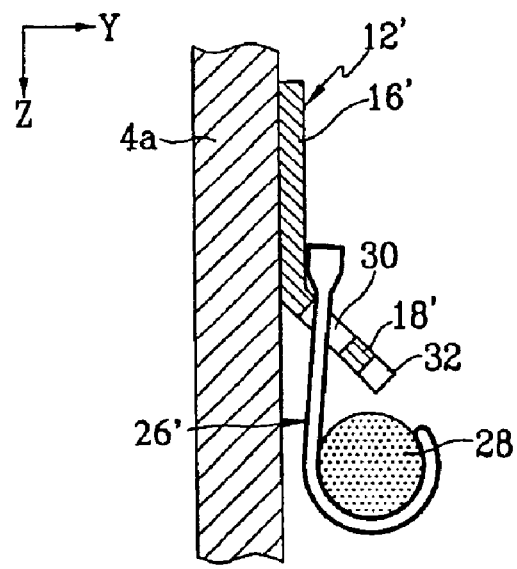

With reference to FIGS. 13 and 14, the degaussing coil 28 is positioned on the skirt 4a abutting an under portion of the degaussing coil support 18' (or on the skirt 4a in close proximity to the degaussing coil support 18'). Next, a tie band 24 or a fixing bracket 26' is passed through the first and second openings 30 and 32 and used to fasten the degaussing coil 28, thereby fixedly mounting the degaussing coil 28 to the implosion preventing band 12'. Using a single fixing bracket 26' as an example, one end 26a' of the fixing bracket 26' is curved into a semicircular shape to hook onto the degaussing coil 28, and its other end 26b' is formed so that the fixing bracket 26' may not be removed from the implosion preventing band 12'.

In the second preferred embodiment of the present invention, since a plurality of pairs of the third and fourth openings 30 and 32 are provided in the degaussing coil supports 18' in a continuous manner, it is possible to easily change the mounting positions of and spacing between the tie bands 24 or the fixing brackets 26'. That is, it is unnecessary to change the configuration of the degaussing coil supports 18', or the tie bands 24 or the fixing brackets 26' themselves to obtain different mounting structures for the degaussing coil(s).

In the implosion preventing band of the present invention described above, the degaussing coil supports formed on the implosion preventing band do not pose a safety risk to assembly workers. nor do they damage the bulb. Also, with the provision of the plurality of openings in the degaussing coil supports in a continuous manner, it is easy to change the mounting configuration of the degaussing coil(s).

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An implosion preventing band for a cathode ray tube, comprising:
    a main band formed around an outer surface of a skirt of a face panel, and including a pair of long sides provided on opposite sides of said skirt in a direction corresponding to long sides of a screen, a pair of short sides provided on opposite sides of said skirt in a direction corresponding to short sides of a screen, and corners formed between said long sides and said short sides to interconnect said long and short sides; and
    degaussing coil supports formed raised from said main band on long and short sides of said main band, and each of said degaussing coil supports including a plurality of openings allowing passage in a direction of a width of said main band, at least one degaussing coil being supported using the openings,
    with the plurality of the openings being formed continuously in said degaussing coil supports in a circumferential direction of said main band.

2. An implosion preventing band for a cathode ray tube, comprising:
    a main band formed around an outer surface of a skirt of a face panel, and including a pair of long sides provided on opposite sides of said skirt in a direction corresponding to long sides of a screen, a pair of short sides provided on opposite sides of said skirt in a direction corresponding to short sides of a screen, and corners formed between said long sides and said short sides to interconnect said long and short sides; and
    degaussing coil supports formed raised from said main band on long and short sides of said main band, and each of said degaussing coil supports including at least one opening allowing passage in a direction of a width of said main band, at least one degaussing coil being supported using the openings,
    with a plurality of the openings being formed continuously in said degaussing coil supports in a circumferential direction of said main band,
    wherein said degaussing coil supports are formed having a triangular form in cross section with each degaussing coil support including a front face including an outer surface opposing said face panel, and a rear face including an outer surface opposing said neck, and in which a point where said front face and said rear face meet has a maximum height from the outer surface of said skirt.

3. The implosion preventing band of claim 2, wherein the openings include first and second openings that are formed opposing one another in said front and rear faces of said degaussing coil supports in the direction of a width of said implosion preventing band.

4. The implosion preventing band of claim 3, wherein the first and second openings are substantially identically formed as rectangles including long sides and short sides.

5. The implosion preventing band of claim 4, wherein said degaussing coil supports satisfy the following condition, $0.1L2 < \Sigma L1 < 0.5L2$, where L2 is a length of one of the degaussing coil supports in a circumferential direction of the implosion preventing band, L1 is a length of a long side of any one of the openings, and $\Sigma L1$ is a sum of all the lengths L1 of each pair of the first and second openings.

6. The implosion preventing band of claim 4, wherein said degaussing coil supports satisfy the following condition, $0.5L3 \leq 2L2 \leq 1.0L3$, where L3 is a circumferential length of said main band, and $\Sigma L2$ is a sum of lengths of all the degaussing coil supports in a circumferential direction of said implosion preventing band.

7. The implosion preventing band of claim 4, wherein said degaussing coil supports satisfy the following condition, $H > 2.0t$, where H is the maximum height from the outer surface of said skirt to said degaussing coil supports, and t is a thickness of said main band.

8. The implosion preventing band of claim 4, wherein said degaussing coil supports satisfy the following condition, $W1 < (H-2t)$, where W1 is a length of a short side of any one of the first and second openings, H is the maximum height from the outer surface of said skirt to said degaussing coil supports, and t is a thickness of said main band.

9. The implosion preventing band of claim 4, wherein said degaussing coil supports satisfy the following condition, $W2 \geq H$, where W2 is a width of said degaussing coil supports in the direction of the width of said main band, and H is the maximum height from the outer surface of said skirt to the degaussing coil supports.

10. The implosion preventing band of claim 4, wherein said degaussing coil supports satisfy the following condition, $W3 > 2t$, where W3 is a distance between an outer surface of an end of the rear face of said degaussing coil supports, the end of the rear face being closest to said skirt, and an edge of said implosion preventing band closest to the end of the rear face, and t is a thickness of said main band.

11. The implosion preventing band of claim 1, wherein said degaussing coil supports are realized by raising edges of said main band on long and short sides of said main band, in which the edges that are raised are closest to a neck of said cathode ray tube accommodating said main band being bent at a predetermined angle and the raised edges having a maximum height from the outer surface of said skirt, said degaussing coil supports resulting in substantially a rectangular shape including long sides and short sides.

12. The implosion preventing band of claim 11, wherein the openings include first and second openings that are formed aligned in the direction of a width of said degaussing coil supports.

13. An implosion preventing band for a cathode ray tube comprising:
    a main band formed around an outer surface of a skirt of a face panel, and including a pair of long sides provided on opposite sides of said skirt in a direction corresponding to long sides of a screen, a pair of short sides provided on opposite sides of said skirt in a direction corresponding to short sides of a screen, and corners formed between said long sides and said short sides to interconnect said long and short sides; and degaussing coil supports formed raised from said main band on long and short sides of said main band, and each of said degaussing coil supports including at least one opening allowing passage in a direction of a width of said main band, at least one degaussing coil being supported using the openings, with a plurality of the openings being formed continuously in said degaussing coil supports in a circumferential direction of said main band, wherein said degaussing coil supports are realized by raising edges of said main band on long and short sides of said main band, in which the edges that are raised are closest to a neck of said cathode ray tube accommodating said main band being bent at a predetermined angle and the raised edges having a maximum height from the outer surface of said skirt, said degaussing coil supports resulting in substantially a rectangular shape including long sides and short sides, wherein the openings include third and fourth openings that are formed aligned in the direction of a width of said degaussing coil supports, wherein the third and fourth openings are substantially formed as rectangles including long sides in the circumferential direction of said implosion preventing band and short sides substantially perpendicular to the long sides, the fourth openings including one long side that is open and not enclosed by the material of said degaussing coil supports to be formed as grooves in said degaussing coil supports.

14. The implosion preventing band of claim 13, wherein said degaussing coil supports satisfy the following condition, $$0.1L5 < \Sigma L4 < 0.5L5,$$

where L5 is a length of one of said degaussing coil supports in a circumferential direction of said implosion preventing band, L4 is a length of a long side of any one of the openings, and ΣL4 is a sum of all the lengths L4 of each pair of the third and fourth openings.

15. The implosion preventing band of claim 13, wherein said degaussing coil supports satisfy the following condition, $$0.5L6 < \Sigma L5 \leq 1.0L6,$$

where L6 is a circumferential length of said main band, and ΣL5 is a sum of lengths of all said degaussing coil supports in a circumferential direction of said implosion preventing band.

16. The implosion preventing band of claim 13, wherein said degaussing coil supports satisfy the following condition, $$2.0t' < H' < 10.0t',$$

where H' is a maximum height from the outer surface of said skirt to a distal edge portion of said degaussing coil supports, and t' is a thickness of said main band.

17. The implosion preventing band of claim 13, wherein said degaussing coil supports satisfy the following conditions, $$W4 \geq W5,$$
$$W4 \leq H',$$

where W4 is a length of the short sides of the third openings, W5 is a length of the short sides of the fourth openings, and H' is a maximum height from the outer surface of said skirt to a distal edge portion of said degaussing coil supports.

18. The implosion preventing band of claim 13, wherein said degaussing coil supports satisfy the following condition, $$0.1W7 \leq W6 \leq 0.3W7,$$

where W6 is a width of the degaussing coil supports and W7 is a width of the implosion preventing band.

19. A cathode ray tube, comprising:

a bulb including a face panel on an inner surface of which is formed a phosphor screen, a neck including an electron gun mounted therein, and a funnel formed between and connected to said face panel and said neck, the elements of said bulb including said face panel, said neck, and said funnel being fused into an integral unit;

an implosion preventing band including a main band formed around an outer surface of a skirt of said face panel, and degaussing coil supports formed raised from said main band on long and short sides of said main band, and each of said degaussing coil supports including a plurality of openings that allow passage in a direction of a width of said main band, the plurality of the openings being formed continuously in said degaussing coil supports in a circumferential direction of said main band; and at least one degaussing coil securely supported on an outer surface of said bulb and at a specific location of the implosion preventing band using at least one fixing member that passes through at least one pair of the openings of said degaussing coil supports.

20. The cathode ray tube of claim 19, wherein said degaussing coil supports are formed having a triangular form in cross section with each degaussing coil support including a front face having an outer surface opposing said face panel, and a rear face having an outer surface opposing said neck, and in which a point where the front face and the rear face meet has a maximum height from the outer surface of said skirt.

21. The cathode ray tube of claim 19, wherein said degaussing coil supports are realized by raising edges of said main band on long and short sides of main band, in which the edges that are raised are closest to said neck of said cathode ray tube accommodating said main band being bent at a predetermined angle and the raised edges having a maximum height from the outer surface of said skirt.

22. An implosion preventing band for a cathode ray tube, comprising:

a main band formed around an outer surface of a skirt of a face panel; and a plurality of degaussing coil supports raised from said main band, and each of said degaussing coil supports including at least two openings opposing each other and accommodating passage in a direction of a width of said main band, at least one degaussing coil being supported using at least one of the at least two openings, the plurality of the openings allowing passage in a direction of the width of said main band being formed continuously in said degaussing coil supports in a circumferential direction of said main band.

* * * * *